United States Patent
Creamer et al.

(10) Patent No.: US 6,876,733 B2
(45) Date of Patent: *Apr. 5, 2005

(54) GENERIC SERVICE COMPONENT FOR MESSAGE FORMATTING

(75) Inventors: Thomas E. Creamer, Boca Raton, FL (US); Joseph H. McIntyre, Austin, TX (US); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 161 days.

This patent is subject to a terminal disclaimer.

(21) Appl. No.: 10/308,590

(22) Filed: Dec. 3, 2002

(65) Prior Publication Data

US 2004/0105537 A1 Jun. 3, 2004

(51) Int. Cl.⁷ .......................... H04M 3/42; H04M 7/00; G06F 9/00
(52) U.S. Cl. ............................ 379/201.12; 379/221.08; 719/328
(58) Field of Search ................. 379/221.08–221.12, 379/219, 220.01, 229, 230, 201.12; 709/223; 719/310, 328

(56) References Cited

U.S. PATENT DOCUMENTS

| | | | |
|---|---|---|---|
| 5,574,904 A | 11/1996 | Yunoki et al. | 395/601 |
| 5,703,940 A | * 12/1997 | Sattar et al. | 379/201.05 |
| 6,014,437 A | 1/2000 | Acker et al. | 379/219 |
| 6,028,924 A | * 2/2000 | Ram et al. | 379/229 |
| 6,181,935 B1 | 1/2001 | Gossman et al. | 455/433 |
| 6,222,916 B1 | 4/2001 | Cameron et al. | 379/207 |
| 6,243,457 B1 | 6/2001 | Lin et al. | 379/230 |
| 6,269,396 B1 | 7/2001 | Shah et al. | 709/223 |
| 2002/0154646 A1 | * 10/2002 | Dubois et al. | 370/406 |

OTHER PUBLICATIONS

*Using An Object Database In Intelligent Network Applications, Objectivity, Inc.,* (2000).
J. de Keijzer, et al., *JAIN: A New Approach to Services In Communication Networks, IEEE Communications Magazine,* pp. 94–99, (Jan. 2000).
*About UDDI,* <http://www.uddi.org/about.html>, (viewed Oct. 8, 2002).
*Signaling System Number Seven (SS7):Overview,* <http://www.cisco.com/univercd/cc/td/doc/product/tel_pswt/vco_prod/ss7_fund/ss7fun01.htm>, (viewed Oct. 8, 2002).
*SS& Signaling Architecture,* <http://www.cisco.com/univercd/cc/td/doc/product/tel_pswt/vco_prod/ss7_fund/ss7fun02.htm>, (viewed Oct. 8, 2002).
*SS7 Protocol Stack,* <http://www.cisco.com/univercd/cc/td/doc/product/tel_pswt/vco_prod/ss7_fund/ss7fun03.htm>, (viewed Oct. 8, 2002).
U.S. Appl. No. 09/620,265, filed Jul. 19, 2000, Casile, et al.

* cited by examiner

*Primary Examiner*—Benny Tieu
(74) *Attorney, Agent, or Firm*—Akerman Senterfitt

(57) ABSTRACT

An advanced intelligent network for use with a telecommunication service can include a service logic execution environment (SLEE), at least one service application executing in the SLEE, and at least one message formatting generic service component communicatively linked to the service application. The message formatting generic service component can include an interface to an application which is external to the SLEE.

25 Claims, 3 Drawing Sheets

GENERIC SERVICE COMPONENT FOR MESSAGE FORMATTING

BACKGROUND OF THE INVENTION

1. Technical Field

The present invention relates to the field of telecommunications, and more particularly, to generic service components for formatting messages in conjunction with a service logic execution environment.

2. Description of the Related Art

The development of the open network application programming interface (API) represents an important departure from traditional methods for opening the architecture of the public switched telephone network (PSTN). Presently, the Advanced Intelligent Network (AIN) architecture defines a call model which allows the creation of telecommunications service applications outside of the switch environment. Telecommunications service applications are a la carte telecommunications applications which can perform enhanced services for a telecommunications session established among two or more parties. Exemplary service applications can include Call Waiting, Caller ID, Call Forwarding, Message Activated Dialing, and Meet-me Conferencing.

When AIN first was introduced, in terms of the service application creation process, the AIN architecture represented an important advance. AIN separated service development from switching, allowing service logic components to be developed more quickly and placed in specialized network elements attached to databases. Switches, in turn, being free from all service logic, could be optimized for speed and efficiency. Still, typical service applications developed to the AIN specification are written in specialized languages by specially trained programmers using specialized service creation environments.

Importantly, future telecommunications networks will be characterized by new and evolving network architectures where packet-switched, circuit-switched, and wireless networks are integrated to offer subscribers an array of innovative multimedia, multiparty applications. Equally important, it is expected that the process by which telecommunications applications are developed will change, and will no longer solely be the domain of the telecommunications network or service application provider. In fact, in order to provide a broad portfolio of novel, compelling applications rapidly, service application providers will increasingly turn to third-party applications developers and software vendors. Thus, application development in the telecommunications domain will more closely resemble that of software and information technology in general, with customers reaping the benefits of increased competition, reduced time to market, and the rapid leveraging of new technology as it is developed.

To make this vision a reality, the principles of AIN have been discarded in favor of a new service application component paradigm. Specifically, it has been recognized that future integrated networks must offer application developers a set of standard, open APIs so that applications written for compatibility with one vendor's system can execute in the system of another vendor. In consequence, the cost of applications development can be amortized, reducing the final cost to the customer. Java APIs for Integrated Networks (JAIN®) fulfills the requirements of the new service application component development paradigm. Presently, JAIN includes standard, open published Java APIs for next-generation systems consisting of integrated Internet Protocol (IP) or asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the Java platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 105 which can include interfaces to IP, wireline and wireless signaling protocols. These protocols can include TCAP, ISUP, INAP, MAP, SIP, MGCP, and H.323. The JAIN implementation also can include a signaling layer 110 which can include interfaces to provide connectivity management and call control. The conventional JAIN implementation also can include an application layer 115 for handling secure network access and other external services. Finally, the conventional JAIN implementation can include a service layer 120 which can include a JAIN compliant service creation and carrier grade service logic execution environment (JSLEE) 125.

In JAIN, the protocol layer 105 and the signaling layer 110 are based upon a Java standardization of specific signaling protocols and provide standardized protocol interfaces in an object model. Additionally, applications and protocol stacks can be interchanged, all the while providing a high degree of portability to the applications in the application layer using protocol stacks from different sources. By comparison, the application layer 115 provides a single call model across all supported protocols in the protocol layer 105. Fundamentally, the application layer 115 provides a single state machine for multiparty, multimedia, and multi-protocol sessions for service components in the application layer 115. This state machine is accessible by trusted applications that execute in the application layer 115 through a call control API.

Notably, applications or services executing at the application layer 115 can communicate directly with protocol adapters in the JSLEE 125. Protocol adapters typically are class methods, callbacks, event or interfaces that encapsulate the underlying resources such as TCAP, MGCP, etc. The underlying resources can be implemented in many programming languages, but a JAIN-conformant protocol product must provide at least the relevant JAIN API. In contrast, an external application or service executing in the application layer 115 does not have to be aware of the underlying resources and can remain oblivious to the fact that some of its session or call legs may be using different protocols.

Service components 130 are the core JAIN components and can execute in the JSLEE 125. More particularly, service components 130 are constructed according to a standard component model, and instantiations of component assemblies can execute in coordination with the JSLEE 125. Using information regarding the protocol layer 105 which can be incorporated into the JSLEE 125, service components 130 can interact with the underlying protocol stacks without having specific knowledge of the protocol stack. The service components 130 can use the call model provided by the application layer 115 to implement telecommunication services. More importantly, the JSLEE 125 can relieve the service components 130 of conventional lifecycle responsibilities by providing portable support for transactions, persistence, load balancing, security, and object and connection instance pooling. In this way, the service components 130 can focus on providing telecommunication services.

Despite the apparent advantages of the JAIN specification, however, conventional implementations of the JAIN specification include some drawbacks, particularly in their application to real-time telephony. First, conventional JSLEE implementations include unnecessary system housekeeping chores, for example lifecycle responsibilities. Lifecycle responsibilities, however, are not as critical in the real-time telephony domain as they are in other communication domains. Thus the use of the JSLEE can introduce too many latencies to satisfy the demands for real time operations. More importantly, in order to relieve service components of the complexities of the protocol stacks, conventional SLEEs require specific knowledge of the underlying protocol layer.

Further, the complexities involved make it difficult to port systems, features, and applications across diverse hardware and/or software environments. For example, because the protocol and logic necessary to access a particular service functionality are included within the service application being developed, any changes to an underlying protocol can necessitate reprogramming of the entire service application. To migrate a given telecommunication application to another hardware and/or software environment, the telecommunication application must be redesigned and/or recoded to work with the particular messaging protocol utilized by the application processing platform with which the telecommunication application is to be used.

SUMMARY OF THE INVENTION

The invention disclosed herein concerns a method and a system for providing a generic service component (GSC) for use with a service logic execution environment (SLEE). In particular, a GSC can provide a common application programming interface (API) for accessing a particular message formatting platform or application. A message formatting GSC also can include the necessary functionality and protocol information for interacting with those message formatting platforms. Using the common API, message formatting GSCs can be made available to developers in a manner which does not require the developer to have knowledge of any underlying protocols incorporated within the message formatting GSC. Rather, the service application developer need only be concerned with the functionality of each message formatting GSC which is to be called upon within the developer's service application.

Accordingly, the present invention provides a solution on the same platform wherein the service logic executes for generically accessing any of a variety of manufacturer specific or disparate applications which communicate to the SLEE through diverse message formats, such as extensible markup language (XML), hypertext markup language (HTML) and standard generalized markup language (SGML). By maintaining the message formatting platform interface on the service logic platform, service logic applications can be portable across diverse hardware and software platform environments when accompanied by a message formatting GSC. Additionally, message formatting functions need not be incorporated within other GSCs and SCs, but can instead utilize message format functions from the message formatting GSC.

One aspect of the invention can include an advanced intelligent network for use with a telecommunication service. The invention can include a SLEE, at least one service application executing in the SLEE, and at least one message formatting GSC communicatively linked to the service application. The message formatting GSC can include an interface to an application which is external to the SLEE.

A second aspect of the invention can include a message formatting GSC in a telephony environment having a SLEE. The message formatting GSC can be registered with the SLEE for interacting with a service application which may or may not execute within the SLEE. The message formatting GSC can include at least one client service instance. The client service instance can correspond to a message formatting application which can be external to the SLEE. Additionally, each client service instance can include a content interface for publishing an interface to the client service instance.

The message formatting GSC also can include a service wrapper. The service wrapper can provide a common interface to one or more client service instances for routing events between the SLEE and the various client service instances. The service wrapper can include a deployment descriptor for providing configuration information to the SLEE and a service interface for publishing an interface to the service wrapper. Also, the service wrapper can include a protocol stack for managing communications in the telephony environment. Notably, the message formatting GSC can interact with other GSCs, service components, protocol stacks, and external applications.

Another aspect of the invention can include a method of routing events between the SLEE and a message formatting GSC in a telephony environment. In that case, the method can include the message formatting GSC registering with the SLEE and the message formatting GSC receiving a first event routed by the SLEE. The first event can correspond to a service application which the message formatting GSC has been registered to receive from the SLEE. Further, the first event can be from a protocol stack, a service component, an external application, or another GSC. At least one client service instance can be instantiated for communicating with another application. The client service instance can interact with the other application. A second event can be posted to the SLEE responsive to the interaction between the client service instance and the other application. The second event can correspond to the interaction, and can be directed to the service application executing within the SLEE.

BRIEF DESCRIPTION OF THE DRAWINGS

There are shown in the drawings embodiments which are presently preferred, it being understood, however, that the invention is not limited to the precise arrangements and instrumentalities shown.

DESCRIPTION OF THE INVENTION

Figure 1:
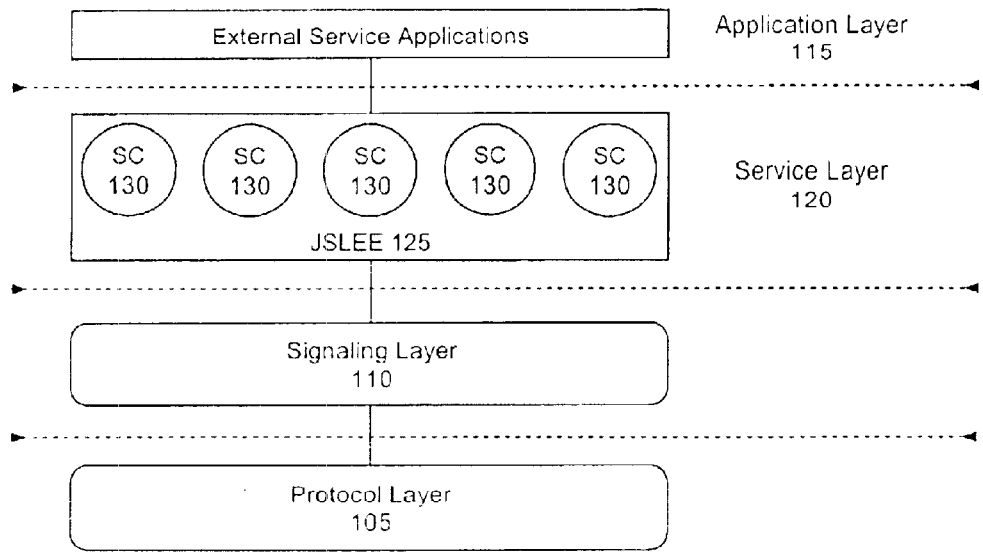
FIG. 1 is a schematic diagram illustrating an intelligent network architecture configured in accordance with a conventional JAIN implementation known in the prior art.

The invention disclosed herein concerns a method and a system for providing a generic service component (GSC) for use with a service logic execution environment (SLEE). In particular, a GSC can provide a common application programming interface (API) for accessing message formatting functions. Correspondingly, each GSC can include the necessary functionality and protocol information for interacting with a particular message formatting component. Accordingly, the message formatting component can convert exchanged messages to a platform independent format, such as XML, assuring application portability across diverse hardware and software platforms.

The incorporation of a SLEE configured in accordance with the inventive arrangements can help solve the deficiencies of the prior art by providing an event routing bus which can facilitate inter-service component event communications. By providing more direct event communications, the inherent latencies associated with a JSLEE implementation utilizing the JAIN specification can be reduced. Also, unlike conventional implementations of a SLEE in which service components only can receive and process events received from a client component such as a protocol stack via the SLEE, in the present invention, service components can also receive and process events from other service components. Thus, advanced combinations of service components can be created from macro service components. Accordingly, a series of service components can sequentially perform tasks via the event bus, resulting in a unitary, complex operation. Consequently, the message formatting component can be utilized by other components within the SLEE, thusly eliminating the necessity for redundant message formatting routines within each SLEE component.

The architecture of the present invention also can include a connector/wrapper interface for communicatively linking the SLEE to client components in the protocol layer. The connector/wrapper interface between the SLEE and client components in the protocol layer also can help to solve the deficiencies of the prior art by providing a configurable connection through a generic interface to a specific client component without inflexibly binding the client component to the SLEE. Unlike conventional implementations of a SLEE in which the SLEE is directly bound to client components with which the SLEE communicates, in the present invention, the SLEE and client component need not be positioned proximately to one another. Rather, the SLEE and client component can be positioned across a network, if need be. In this way, a more flexible association between client component and SLEE is possible which can facilitate the maintenance and enhancement of the SLEE during life-cycle maintenance. Moreover, the specific knowledge of a particular client component can be removed from the SLEE and included, instead, in the interface of the client component. As a result, the complexity of the SLEE can be reduced.

Finally, the architecture of the present invention can include generic service components for providing an abstracted interface to specific external services. More particularly, while each generic service component can maintain an awareness of a particular implementation of a specific external service, other service components, particularly telephony service components executing in the SLEE, can generally request external services of the generic service component without knowing the particular implementation of a corresponding specific external service. In this way the complexity of service components can be reduced and the service components can be de-coupled from specific implementations of external services.

Notably, implementing a message formatting GSC can allow a SLEE to expansively adjust as hardware/software platforms change. For example, service applications need not be restricted to a particular message format, such as XML, in order to relay information to the SLEE. Instead, emerging formats, such as voice extensible markup language (VXML), can be utilized by service applications. The SLEE will merely require a new message formatting GSC for VXML messages. Other components within the SLEE need not be altered.

Figure 2:
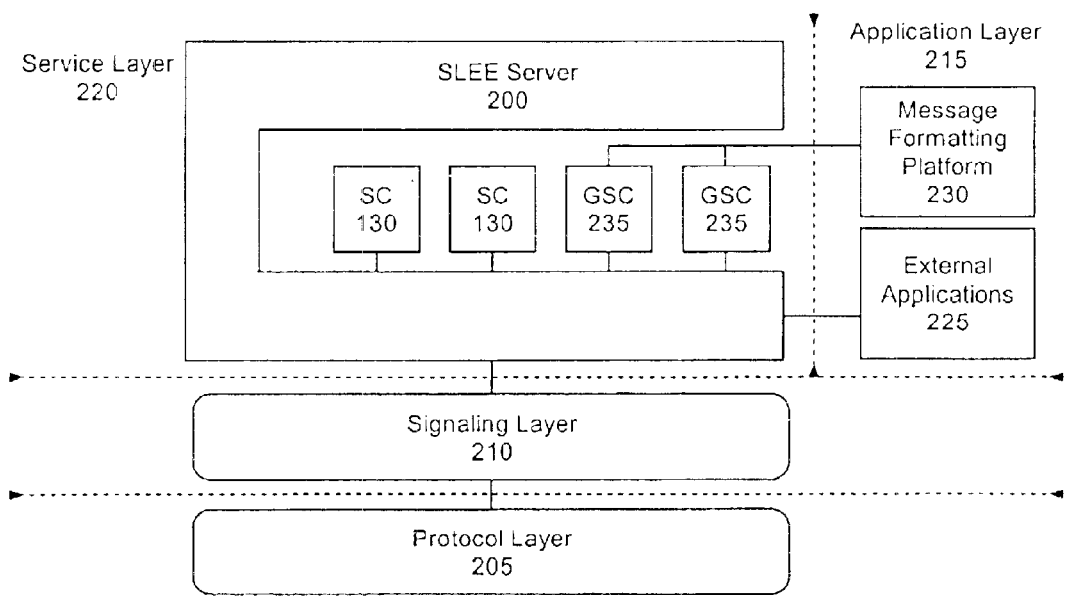
FIG. 2 is a schematic diagram illustrating an intelligent network architecture configured in accordance with the inventive arrangements disclosed herein.

FIG. 2 is a schematic illustration of an intelligent network configured in accordance with the inventive arrangements disclosed herein. Although the network can be configured as a JAIN-compliant network, the network need not be configured as such. The intelligent network can include a protocol layer 205, a signaling layer 210, an application layer 215, and a service layer 220. The application layer 215 can host external third party applications 225 as well as message formatting applications 230. Notably, message formatting applications 230 can be external applications performing message formatting tasks passed from one or more message formatting GSCs. Typical third party applications 225 can suit mass-market demand for services such as virtual private networks (VPNs), inbound services and unified messaging. External third party applications 225 also can include short-lived and niche applications which can be deployed using un-trusted application space deployment technologies such as database lookup interfaces, downloadable mechanisms, and the Parlay API, as are well known in the art.

The service layer 220 can include a SLEE server 200. For example, according to one embodiment of the present invention, the SLEE server 200 can be a JAIN compliant SLEE server or JSLEE server. The protocol layer 205 can include one or more protocol stacks which can be configured to interact with the service components 130 and message formatting GSCs 235 executing in the SLEE Server 200 through a signaling layer 210. Notably, the invention is not limited in regard to the number or type of protocol stacks which can be included in the SLEE server 200. Rather, SLEE Server 200 can interact with any protocol stack, for example those protocol stacks configured in accordance with the JAIN specification.

The message formatting GSCs 235 can provide a common API for accessing message formatting services from one or more different message formatting applications 230. A message formatting GSC 235 can be built for each different message formatting application 230. Moreover, a message formatting GSC 235 can be built for each different protocol used by a message formatting application 230. Thus, as shown in FIG. 2, a plurality of message formatting GSCs 235 can be included, each corresponding to a particular messaging protocol or message formatting application. For example, a different message formatting GSC 235 can be built for each different manufacturer specific message formatting platform and/or application. Notably, manufactures can even utilize propriety message formats for security or efficiency reasons to communicate with the SLEE, so long as an appropriate message formatting GSC 235 is provided.

The SLEE Server 200 also can include several lifecycle management functions enabling the message formatting GSCs 235 to be properly loaded within the SLEE Server 200 for execution. The SLEE Server 200 can identify configuration and loading parameters associated with each message formatting GSC 235 to be loaded. Subsequently, the SLEE Server 200 can execute the message formatting GSCs 235 using the identified configuration and loading parameters. Finally, the message formatting GSCs 235 can register with an internal event handling component in the SLEE Server 200 so that events can be transmitted to and from the message formatting GSCs 235 executing in the SLEE Server 200.

In operation, the SLEE Server 200 can support the transmission and receipt of events to and from the protocol stacks in the protocol layer 205. More particularly, the events can be transmitted and received in the event handling component included in the SLEE Server 200. Likewise, service components 130 and message formatting GSCs 235 which are registered with the SLEE Server 200 can receive protocol stack events directed towards particular ones of the service components 130 and the message formatting GSCs 235. More specifically, the event handling component can route received events to service components 130 which have registered with the SLEE Server 200 to receive such events. The service components 130 and message formatting GSCs 235 further can post protocol stack events to the SLEE Server 200.

The SLEE Server 200 also can receive and transmit messages among message formatting GSCs 235, service components 130, and between a message formatting GSC 235 and a service component 130. Specifically, message formatting GSCs 235 can be configured to post messages to the event handling component of the SLEE Server 200. The message formatting GSCs 235 further can be registered with the SLEE Server 200 to receive posted events from other GSCs, whether message formatting GSCs or not, as well as service components 130. In this way, inter-GSC and service component communications can be made possible. The message formatting GSCs 235 can be configured to receive events from external applications 225 through the SLEE Server 200 as well as send events to the external applications 225. For example, those events which are received from external applications 225 can be posted to the event handling component of the SLEE Server 200. The events then can be routed to message formatting GSCs 235 that have registered to receive such events.

Figure 3:
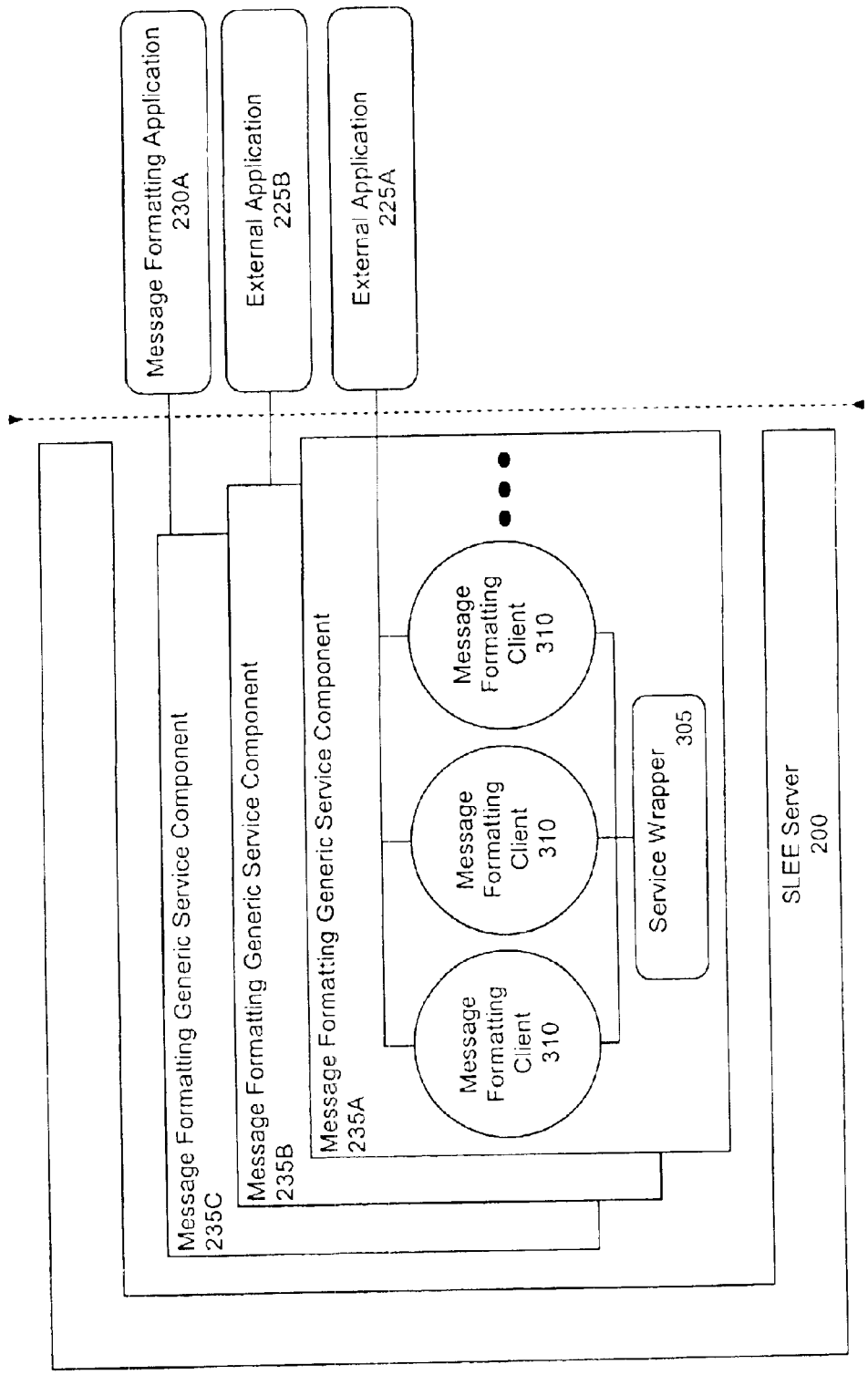
FIG. 3 is a schematic diagram illustrating multiple message formatting generic service components for use with the intelligent network architecture of FIG. 2.

FIG. 3 is a simplified pictorial representation of the exemplary message formatting GSCs 235 of FIG. 2. As shown in FIG. 3, a message formatting GSC 235 can include a service wrapper 305 and one or more client service instances 310. The service wrapper 305 can register with the SLEE Server 200 to receive a particular type of event corresponding to a message formatting function to be performed. Accordingly, the service wrapper 305 can determine which message formatting GSC should be utilized for a particular message formatting task.

Notably, a given message formatting GSC, such as message formatting GSC 235C, can be linked to an external message formatting application 230A, wherein the external message formatting application 230A performs individual message formatting operations. Alternately, the message formatting operations can be performed by the message formatting GSCs, such as components 235A and 235B, without requiring the assistance of an external application. Once the message formatting GSC 235 performs necessary message formatting functions, the reformatted event can be routed to the particular external application 225 targeted by the SLEE to receive the event. Subsequently, the service wrapper 305 can instantiate a client service instance 310 for processing a particular transaction. The client service instance 310 also can be instantiated for communicating with a particular external application 225.

As shown in FIG. 3, and in accordance with the inventive arrangements disclosed herein, one or more message formatting GSCs 235A, 235B, and 235C can be provided, wherein each corresponds to a manufacturer specific message formatting application, external application, or to a particular messaging protocol used by one or more external applications. For example, the service wrapper 305, as part of the message formatting GSC 235A, can register with the SLEE Server 200 to receive message formatting events, such as events formatted using an internal messaging format which are to be converted to an XML format. Accordingly, the message formatting GSC 235A can be configured to utilize the same messaging protocol as the external application 230A, for example XML format.

As shown in FIG. 3, the service wrapper 305 has instantiated three client service instances 310, one for each received event or series of events comprising a transaction relating to a message formatting function. For example, each of the GSCs 235 can be associated with a particular external application such that each client service instance within a given GSC 235 interacts with a same external application to accomplish a different task. Alternatively, a single client service instance 310 can handle multiple transactions. In that case, each client service instance 310 of message formatting GSC 235A, for example, can interact with an associated one of the external applications, in this case external application 225A. Consequently, if three different external applications, such as a voice processing application, a directory services application, and data management application utilize message formatting GSC 235A, each external application can be associated with a particular one of the message formatting clients 310.

Similarly, the message formatting GSC 235B can include a service wrapper and one or more client service instances for interacting with external applications, such as external application 225B. For example, message formatting GSC 235A can receive events formatting using an internal message format and converting such messages to VoiceXML format, required by external application 225B. As noted, if external applications 225A and 225B each utilize the same messaging protocol, then a single message formatting GSC 235 can interact with both external applications. Still, it should be appreciated that a message formatting GSC can be built for the format required by any external application, including proprietary or private message formats, as may be necessary.

Furthermore, the message formatting GSC 235C can reference an external message formatting application, such as message formatting application 230A. The ability for a GSC to allow for message formatting to occur externally demonstrates the inherent flexibility of the GSC model. For example, message formatting application 230A can contain a library of seldom needed message conversions for legacy protocols. Such a library, accessed through message formatting GSC 235C, can nevertheless be invaluable on those rare occasions that such legacy protocols are demanded.

Figure 4:
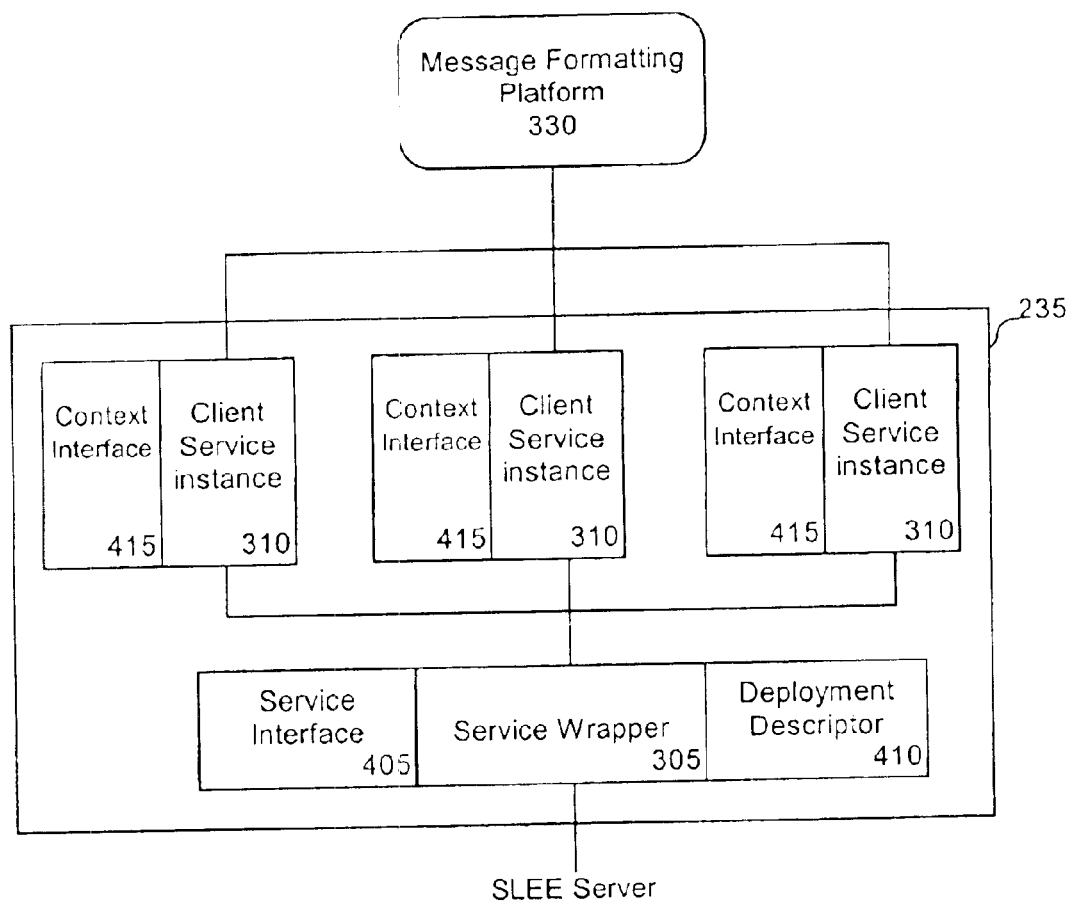
FIG. 4 is a schematic diagram illustrating an exemplary message formatting generic service component.

FIG. 4 is a schematic diagram illustrating the exemplary message formatting GSC 235 of FIG. 3. As shown in FIG. 4, the message formatting GSC 235 can include a service wrapper 305 and one or more client service instances 310 as previously discussed. The client service instances 310 can be individually instantiated services. Each service instance 310 further can register with the event routing bus of the SLEE Server. The message formatting GSC 235 also can include a service interface 405, a deployment descriptor 410, and one or more context interfaces 415. The deployment descriptor 410 can be a document which can describe the proper parameters for initially loading an instance of the message formatting GSC 235 in the SLEE Server. The service interface 405 can publish the interface to the service wrapper 305 to external objects. Accordingly, the service instance 310 can register with the internal event handling component of the SLEE Server via the service wrapper 305, and specifically the deployment descriptor 410, to receive and transmit events to the protocol layer, as well as service components and the message formatting GSCs 235.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. An advanced intelligent network for use with a telecommunication service comprising:
    a service logic execution environment (SLEE);
    at least one service application executing in said SLEE; and
    at least one message formatting generic service component communicatively linked to said service application, said message formatting genetic service component comprising an interface to an application which is external to said SLEE.

2. In a telephony environment having a service logic execution environment (SLEE), a message formatting generic service component, being registered with the SLEE, for interacting with a service application, said message formatting generic service component comprising:
    at least one client service instance, each said client service instance corresponding to a message formatting application; and,
    a service wrapper, said service wrapper providing a common interface to said at least one client service instance for routing events between the SLEE and said at least one client service instance.

3. The message formatting generic service component of claim 2, said service wrapper further comprising a deployment descriptor for providing configuration information to the SLEE.

4. The message formatting generic service component of claim 2, said service wrapper further comprising a service interface for publishing an interface to said service wrapper.

5. The message formatting generic service component of claim 2, said at least one client service instance further comprising a content interface for publishing an interface to said client service instance.

6. The message formatting generic service component of claim 2, wherein said message formatting generic service component interacts with other generic service components, external applications, service components, or protocol stacks.

7. The message formatting generic service component of claim 2, said service wrapper further comprising a protocol stack for managing communications in a telephony environment.

8. The message formatting generic service component of claim 2, wherein said service application is internal to the SLEE.

9. The message formatting generic service component of claim 2, wherein said message formatting application is external to the SLEE.

10. In a telephony environment having a service logic execution environment (SLEE), a method of routing events between the SLEE and a message formatting generic service component, said method comprising:
    the message formatting generic service component registering with the SLEE; and,
    the message formatting generic service component receiving a first event routed by the SLEE said first event corresponding to a service application which the message formatting generic service component has registered to receive from the SLEE.

11. The method of claim 10, further comprising:
    instantiating at least one client service instance for communicating with an application external to the SLEE, said client service instance interacting with said application.

12. The method of claim 11, further comprising:
    posting a second event to the SLEE responsive to said interaction between said client service instance and said application, said second event corresponding to said interaction.

13. The method of claim 12, wherein said second event is directed to a service application executing within the SLEE.

14. The method of claim 10, wherein said first event is from a protocol stack.

15. The method of claim 10, wherein said first event is from another generic service component.

16. The method of claim 10, wherein said first event is from a service component.

17. The method of claim 10, wherein said first event is from an external application.

18. A machine readable storage, having stored thereon a computer program having a plurality of code sections executable by a machine for causing the machine to perform the steps of: a message formatting generic service component registering with a service logic execution environment (SLEE); and,
    the message formatting generic service component receiving a first event routed by the SLEE, said first event corresponding to a service application which the message formatting generic service component has registered to receive from the SLEE.

19. The machine readable storage of claim 18, further comprising:
    instantiating at least one client service instance for communicating with an application external to the SLEE, said client service instance interacting with said application.

20. The machine readable storage of claim 19, further comprising:
    posting a second event to the SLEE responsive to said interaction between said client service instance and said application, said second event corresponding to said interaction.

21. The machine readable storage of claim 20, wherein said second event is directed to a service application executing within the SLEE.

22. The machine readable storage of claim 18, wherein said first event is from protocol stack.

23. The machine readable storage of claim 18, wherein said first event is from a service component.

24. The machine readable storage of claim 18, wherein said first event is from another generic service component.

25. The machine readable storage of claim 18, wherein said first event is from an external application.

* * * * *